US007005211B2

(12) United States Patent
Kim et al.

(10) Patent No.: US 7,005,211 B2
(45) Date of Patent: Feb. 28, 2006

(54) ELECTRODE, LITHIUM BATTERY HAVING THE ELECTRODE, AND METHOD OF MANUFACTURING THE SAME

(75) Inventors: Kyungho Kim, Cheonan (KR); Hyunsook Jung, Seoul (KR); Sunghwan Na, Asan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 400 days.

(21) Appl. No.: 10/310,817

(22) Filed: Dec. 6, 2002

(65) Prior Publication Data

US 2003/0113625 A1     Jun. 19, 2003

(30) Foreign Application Priority Data

Dec. 7, 2001    (KR) ............................. 2001-77412

(51) Int. Cl.
*H01M 4/62*    (2006.01)
(52) U.S. Cl. .................. 429/217; 429/232; 429/231.1; 429/223; 429/231.3; 429/220; 429/231.6; 429/224; 429/231.5; 427/58

(58) Field of Classification Search ............... 429/217, 429/232, 231.1, 223, 231.3, 220, 231.6, 224, 429/231.5; 427/58
See application file for complete search history.

(56) References Cited

U.S. PATENT DOCUMENTS 6,517,973 B1 * 2/2003 Tomita et al. ........... 429/231.1

FOREIGN PATENT DOCUMENTS

JP           2001-15115         1/2001

\* cited by examiner

*Primary Examiner*—Laura Weiner
(74) *Attorney, Agent, or Firm*—Stein, McEwen & Bui, LLP

(57) ABSTRACT

An electrode including a current collector and active material layers stacked on the current collector, and a lithium battery using the electrode. In the electrode, the active material layers include a complex binder having a fluorinated polymer and mesophase $SiO_2$ particles homogenously combined therein.

27 Claims, 4 Drawing Sheets

ELECTRODE, LITHIUM BATTERY HAVING THE ELECTRODE, AND METHOD OF MANUFACTURING THE SAME

CROSS-REFERENCE TO RELATED APPLICATION

This application claims the benefit of Korean Patent Application No. 2001-77412 filed on Dec. 7, 2001 in the Korean Intellectual Property Office, the disclosure of which is incorporated herein by reference.

BACKGROUND OF THE INVENTION

1. Field of the Invention

The present invention relates to an electrode, a lithium battery using the same, and a method of manufacturing the same. More particularly, the present invention relates to an electrode having improved thermal stability and cycle characteristics, a lithium battery using the same, and a method of manufacturing the same.

2. Description of the Related Art

With the development of portable electronic equipment in recent years, there has been an increasing demand for batteries to be used therein as a power source. In particular, a lithium secondary battery that is capable of charging and discharging has been the focus of intense investigation.

A lithium secondary battery is generally configured to include an anode, a cathode, and a separator is interposed therebetween so as to prevent a short-circuit therebetween. An electrolyte is further included so as to provide a pathway for lithium ions between the electrodes (i.e., the cathode and the anode). As such, the lithium secondary battery produces electric energy by oxidation and reduction reactions, which take place when the lithium ions undergo intercalation and deintercalation in the cathode and the anode.

A lithium metallic battery in which metallic lithium or an alloy thereof is used as the anode leads to the following problem. When a short-circuit occurs due to a formation of dendrite, the lithium metallic battery may explode. Thus, lithium metallic batteries are being replaced by lithium ion batteries using a carbon material as an anode active material.

In the lithium ion battery, while maintaining the original form of an electrode active material thereof, only the lithium ions migrate back and forth during charging and discharging. As such, an improved battery cycling and safety characteristics are achieved as compared with the lithium metallic battery. However, as the requirements for high-capacity batteries have increased, battery safety is an active research area. In this regard, there needs to be functional materials for achieving stable batteries having a large capacity. Accordingly, most battery manufacturers have continued to concentrate on developing safe batteries.

An electrode of a lithium secondary battery is configured such that active material layers containing an active material, a binder, and a conductive agent are laminated on a current collector. Conventionally, fluorinated polymers, such as polyvinylidene fluoride (PVDF), copolymers of vinylidene fluoride and hexafluoropropylene, mixtures of PVDF and styrene-butadiene rubber (SBR) and the like, are generally used as a binder. These binders have good properties including a high impregnating capability of an electrolytic solution and a large adhesive strength between active materials. However, when a lithium secondary battery fabricated using such a fluorinated polymer singly as a binder is overcharged, the thermal stability of the battery deteriorates severely. This is because the fluorinated polymer reacts with the carbon or the graphite used as the anode active material and a large amount of heat is generated. This reaction results in a dehydrofluorination to the fluorinated polymer binder, or further fire or explosion of the battery, so that the battery may not be used any more.

In order to enhance the thermal stability of the fluorinated polymer binder, heat resistant silica ($SiO_2$) filler particles may be added to the PVDF binder so as to fabricate a heat resistant electrode. However, in the case where $SiO_2$ filler particles are present in an anode plate, the $SiO_2$ filler particles, which are highly reactive with lithium, react with the lithium to form an intermetallic compound $Li_4Si$. The irreversibility of the intermetallic compound sharply reduces the charge/discharge capacities with the progress of repeated cycling, which becomes more obvious for large-capacity, lithium secondary batteries. Thus, it is quite difficult to fabricate an anode plate with improved thermal stability while avoiding degrading the cycle characteristics just by adding $SiO_2$ filler particles to an active material layer.

SUMMARY OF THE INVENTION

To solve the above-described and other problems, the invention provides an electrode with improved thermal stability while avoiding degradation in cycle characteristics, and a lithium battery using the electrode.

Also, the present invention provides a method of manufacturing an electrode having improved thermal stability.

Additional aspects and advantages of the invention will be set forth in part in the description which follows and, in part, will be obvious from the description, or may be learned by practice of the invention.

In an aspect, the present invention features an electrode comprising a current collector, and active material layers stacked on the current collector, wherein the active material layers include a complex binder having a fluorinated polymer and mesophase $SiO_2$ particles homogenously combined therein and an active material.

In another aspect, the present invention features a lithium battery comprising a cathode having a cathode active material layer, an anode having an anode active material layer and a separator interposed therebetween, wherein the cathode and anode active material layers each include a complex binder having a fluorinated polymer and mesophase $SiO_2$ particles homogenously combined therein and a corresponding active material.

In one aspect, the average particle size of the mesophase $SiO_2$ particles is in the range of about 50 nm to about 10 $\mu$m.

In another aspect, the mesophase $SiO_2$ particles are contained in an amount of 5 to 75 parts by weight, based on 100 parts by weight of the binder in the active material layers.

In yet another aspect, the mesophase $SiO_2$ particles are condensation polymerization products of hydrolyzed products of silicon alkoxide compounds.

In still another aspect, the silicon alkoxide compounds are at least one selected from the group consisting of tetraethyl ortho-silicate (TEOS), trihexylsilane and 2-methyl-1-(trimethylsilyloxy)-1-propene.

In a further aspect, the active material layers include at least one cathode active material selected from the group consisting of $LiCoO_2$, $LiMnO_2$, $LiMn_2O_4$, $LiNiO_2$, $LiM_xM'_yO_2$ and sulfur, where M is Mn, Ni or Co, M' is Ni, Cu, Ti or Mg, x is in a range of 0.5 to 2, and y is in a range of 0 to 1.

In a still further aspect, the active material layers include at least one anode active material selected from the group consisting of crystalline or non-crystalline carbon and graphite.

In a yet further aspect, the active material layers include 2 to 5 parts by weight of at least one conductive agent selected from the group consisting of carbon black, acetylene black and Ketjen black, based on 100 parts by weight of the binder in the active material layers.

In an additional aspect, the binder in the active material layers is at least one selected from the group consisting of polyvinylidene fluoride (PVDF), copolymers of vinylidene fluoride and hexafluoropropylene, and mixtures of polyvinylidene fluoride (PVDF) and styrene-butadiene rubber (SBR).

In another aspect, the present invention features a method of manufacturing an electrode, including forming an electrode active material composition by mixing 5 to 10 parts by weight of a binder, 0.25 to 7.5 parts by weight of a silicon alkoxide compound and 82.5 to 95 parts by weight of an electrode active material with a solvent, coating the electrode active material composition on a current collector, and forming a complex binder having a fluorinated polymer and mesophase $SiO_2$ particles homogenously combined therein.

In one aspect, the forming the complex binder includes hydrolyzing the silicone alkoxide compound and performing condensation polymerization of the resulting hydrolysis products.

In another aspect, in order to facilitate the hydrolysis, the method further includes adding 0.1 to 2 parts by weight of an acidic or basic catalyst to the active material composition, and the acidic catalyst is oxalic acid.

In yet another aspect, the average particle size of the mesophase $SiO_2$ particles is in a range of about 50 nm to about 10 $\mu$m.

In still another aspect, the silicon alkoxide compounds are at least one selected from the group consisting of tetraethyl ortho-silicate (TEOS), trihexylsilane and 2-methyl-1(trimethylsilyloxy)-1-propene.

In a further aspect, the forming the electrode active material composition comprises first mixing the fluorinated polymer binder and the silicon alkoxide compound with the solvent.

In a still another aspect, the present invention features a lithium battery using an electrode according to the present invention, where the lithium battery has good cycle characteristics and a high thermal stability.

BRIEF DESCRIPTION OF THE DRAWINGS

The above and other aspects and advantages of the present invention will become more apparent by describing in detail embodiments thereof with reference to the accompanying drawings in which.

DETAILED DESCRIPTION OF THE EMBODIMENTS

Figure 1:
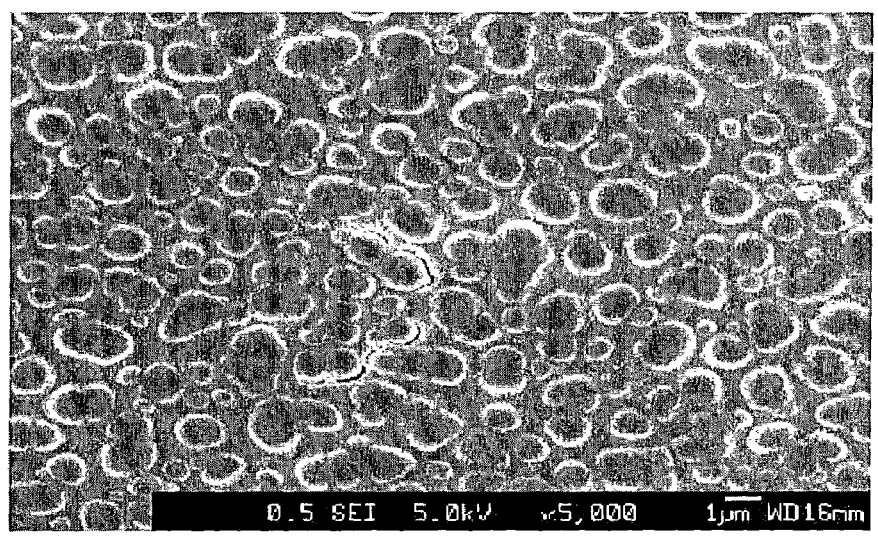
FIG. 1 is a scanning electron micrograph (SEM) image showing the cross section of a complex binder having PVDF and mesophase $SiO_2$ particles homogenously combined therein according to an embodiment of the present invention.

Reference will now be made in detail to the present aspects and embodiments of the present invention, examples of which are illustrated in the accompanying drawings and in specific examples, wherein like reference numerals refer to the like elements throughout. The embodiments are described below in order to explain the present invention by referring to the figures and the specific examples.

An electrode, a lithium battery, and a method of manufacturing the electrode according to the present invention will now be described in detail. According to an aspect of the present invention, the electrode includes an active material layer having a complex binder. The complex binder includes PVDF and mesophase $SiO_2$ particles homogenously combined therein. The mesophase $SiO_2$ particles are in the intermediate phase between liquid and solid phases and are distinguishable from $SiO_2$ filler particles of the conventional active material layer in that various shapes, including a fiber shape, a spherical shape and the like, can exist at the same time. The mesophase $SiO_2$ particles are thermally stable and fine particles having a size of 10 $\mu$m or less can be manufactured. Thus, a complex binder is formed by homogenously mixing the fine mesophase $SiO_2$ particles with a fluorinated polymer, which greatly reduces a contact area between the polymer binder and the active material layer, and decreases the number of reaction sites between the polymer binder and lithium, thereby considerably enhancing thermal stability of a manufactured lithium battery.

According to an aspect of the invention, the average particle size of the mesophase $SiO_2$ particles is in the range of 50 nm to 10 $\mu$m. In order to manufacture the mesophase $SiO_2$ particles having an average particle size of less than 50 nm, it is necessary to heat the silicon alkoxide compound at 130° C. or higher. However, under such conditions, it is difficult to manufacture the desired products due to a high volatility of the silicon alkoxide compound. If the average particle size exceeds 10 $\mu$m, the impregnation capability of the electrolytic solution is lowered. Thus, the performance of a lithium battery, including capacity and cycle life characteristics, sharply decreases.

The content of the mesophase $SiO_2$ particles is in the range of 5 to 75 parts by weight, based on 100 parts by weight of the binder of the active material layer according to an aspect of the invention. If the content of the mesophase $SiO_2$ particles is less than 5 parts by weight, the mesophase particles are not properly formed. If the content is greater than 75 parts by weight, the binding force of the active material is weakened, resulting in a reduction in the binding force between the active material and the substrate.

Examples of the fluorinated polymer binder include polyvinylidene fluoride (PVDF), copolymers of vinylidene fluoride and hexafluoropropylene, and mixtures of PVDF and styrene-butadiene rubber (SBR).

According to an aspect of the invention, the active material layers may include at least one cathode active material selected from the group consisting of $LiCoO_2$, $LiMnO_2$, $LiMn_2O_4$, $LiNiO_2$, $LiM_xM_y'O_2$ and sulfur, where M is Mn, Ni or Co, M' is Ni, Cu, Ti or Mg, x is in the range of 0.5 to 2, and y is in the range of 0 to 1. Also, the active material layers may include at least one anode active material selected from the group consisting of crystalline or non-crystalline carbon and graphite.

Further, the active material layers may include 2 to 5 parts by weight of at least one conductive agent selected from the group consisting of carbon black, acetylene black and Ketjen black, based on 100 parts by weight of the binder in the active material layers. If the content of the conductive agent is less than 2 parts by weight, the electric conductivity becomes poor. If the content of the conductive agent is greater than 5 parts by weight, the capacity of the battery may deteriorate.

Next, a method of manufacturing the electrode according to an aspect of the present invention will now be described. An active material composition is formed by homogenously mixing 5 to 10 parts by weight of a fluorinated polymer binder, 0.25 to 7.5 parts by weight of a silicon alkoxide compound and 82.5 to 95 parts by weight of an electrode active material with a solvent. Examples of the silicon alkoxide compounds include at least one selected from the group consisting of tetraethyl ortho-silicate (TEOS), trihexylsilane and 2-methyl-1-(trimethylsilyloxy)-1-propene. The useful fluorinated polymer binder and electrode active material are as mentioned above. Examples of the solvent include N-methyl-2-pyrrolidone (NMP), acetonitrile, THF and the like.

While not required in all aspects, in order to form in-situ a complex binder having the fluorinated polymer and the mesophase $SiO_2$ particles homogenously combined therein in an active material layer during a subsequent heat treatment process, the silicon alkoxide compound and the fluorinated polymer binder are first mixed with the solvent to be homogenized. The electrode active material and a conductive agent are then mixed. Subsequently, the resulting electrode active material composition is coated on a current collector and heated at 90 to 130° C. As the result of this heating, a sol-gel reaction of the silicon alkoxide compound takes place in the active material layer to form in-situ mesophase $SiO_2$ particles. During the sol-gel reaction, a sol-type silicon alkoxide compound absorbs a trace amount of water contained in the solvent and moisture in the air to then be hydrolyzed. Then, the resulting product of the hydrolysis is subjected to condensation-polymerization to form gel-type mesophase $SiO_2$ particles.

In order to cause the sol-gel reaction, the heating temperature is preferably maintained in a temperature range of 90 to 130° C. If the heating temperature is lower than 90° C., quite a long time is required to form the mesophase $SiO_2$ particles. If the heating temperature is higher than 130° C., extremely high volatility of the silicon alkoxide compound makes it impossible to form mesophase $SiO_2$ particles (i.e., the silicon alkoxide compound volatilizes at a rate higher than that of the sol-gel reaction).

The mechanism of the sol-gel reaction for forming a complex binder having a fluorinated polymer and mesophase $SiO_2$ particles homogenously combined therein is thought to be as follows:

Reaction Formula 1

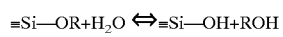

Reaction Formula 2

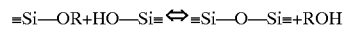

wherein R is an alkyl group.

A silicon alkoxide compound such as TEOS is first hydrolyzed by a trace amount of the water contained in the solvent and moisture in the air, to form a product of hydrolysis, as shown in Reaction formula 1. Subsequently, the product of hydrolysis is condensed with a silicon alkoxide compound and polymerized while forming ether bonds between silicon atoms, as in Reaction formula 2. Such reactions continuously occur to another chemical bonding lines of silicon atom, and a polymer with a network structure, called mesophase $SiO_2$, is finally formed within the binder.

In order to facilitate the sol-gel reaction rate, the electrode active material composition may further comprise 0.1 to 2 parts by weight of an acid or base catalyst. As the acid catalyst, oxalic acid is preferably used because it exerts little influence on the formation of slurry.

As described above, the average particle size of the mesophase $SiO_2$ particles is preferably in the range of about 50 nm to about 10 μm. To this end, it is important to maintain the contents of the respective components and heating temperatures to be in the above-mentioned ranges.

When the electrode of the invention is a cathode, the electrode active material layer may include at least one cathode active material selected from the group consisting of $LiCoO_2$, $LiMnO_2$, $LiMn_2O_4$, $LiNiO_2$, $LiM_xM_y'O_2$ and sulfur. Here, M is Mn, Ni or Co, M' is Ni, Cu, Ti or Mg, x is in the range of 0.5 to 2, and y is in the range of 0 to 1, respectively.

When the electrode of the invention is an anode, the electrode active material layer may include at least one anode active material selected from the group consisting of crystalline or non-crystalline carbon and graphite.

Further, the active material layers may include 2 to 5 parts by weight of at least one conductive agent selected from the group consisting of carbon black, acetylene black and Ketjen black, based on 100 parts by weight of the binder in the active material layers.

A lithium battery according to one embodiment of the present invention will now be described. The lithium battery according to the present invention may be manufactured by general methods of manufacturing lithium batteries. However, the electrode is manufactured by the method described above. That is to say, a cathode and an anode according to the present invention are first prepared independently by the above-described method. Thereafter, a separator is interposed between the cathode and the anode to form a resultant structure. The resultant structure is then wound or stacked to form an electrode structure, and the electrode structure is put into a battery case to then be assembled. Then, an electrolytic solution containing a nonaqueous organic solvent and a lithium salt is impregnated into the battery case having the electrode structure accommodated therein and then sealed, thereby completing the lithium battery.

Examples of the nonaqueous organic solvent include ethylene carbonate, propylene carbonate, dimethyl carbonate, methylethyl carbonate, diethyl carbonate, methylpropyl carbonate, ethylpropyl carbonate, methylbutyl carbonate, tetrahydrofuran, 2-methyltetrahydrofuran, diethoxyethane, methyl formate, ethyl formate, triglyme, tetraglyme, fluorobenzene, difluorobenzene, γ-butyrolactone or mixtures thereof.

Examples of the lithium salt include $LiPF_6$, $LiClO_4$, $LiBF_4$, $LiBF_6$, $LiCF_3SO_3$, $LiAsF_6$, $LiC_4F_9SO_3$, LiN $(SO_2CF_3)_2$, $LiN(SO_2C_2F_5)_2$, and a mixture thereof. Here, the concentration of the lithium salt is preferably in the range of 0.3 to 0.5 mole per liter.

In the manufacture of a lithium ion polymer battery, a polymerization initiator and an unsaturated monomer are further contained in the electrolytic solution in typical amounts. In the course of manufacturing the battery, a polymerization of the monomer is performed by heat or UV ray to form a polymer electrolyte.

The present invention will now be described in more detail with reference to the following examples. The examples are put forth to better describe aspects of the invention and are not to be construed as limiting the scope of this invention as defined in the accompanying claims.

EXAMPLE

To 1000 ml of N-methyl-2-pyrrolidone (NMP) were added 10 g of polyvinylidene fluoride (PVDF) (KUREHA CORP.), 3 g of tetraethyl ortho-silicate (TEOS) and 0.5 g of oxalic acid, and the mixture was dissolved by mixing for 1 hour. 1000 g of crystalline artificial graphite (JAPAN CARBON CORP., P15B-HG) as an anode active material was further added to the resulting mixture, and mixed for 30 minutes to form an anode active material composition.

The anode active material composition was coated on a 100 µm thick, 32 cm wide copper foil using a doctor blade and heated in a drying oven maintained at a temperature of approximately 110° C. for 3 minutes, to then initiate hydrolysis and condensation of the TEOS. Subsequently, the resultant product was dried, rolled, and cut into a predetermined size, thereby fabricating an anode.

Next, 3 g of polyvinylidene fluoride (PVDF) (KUREHA CORP.) was add to 100 ml of NMP and mixed for 1 hour so as to dissolve. 94 g of $LiCoO_2$ as a cathode active material and 3 g of carbon black (Super-P) were added to the mixture to form a slurry using a Planetary mixer, to form a cathode active material composition.

The cathode active material composition was coated on a 100 µm thick, 30 cm wide aluminum foil using a doctor blade, dried, rolled and then cut into a predetermined size, thereby fabricating a cathode.

A 25 µm thick polyethylene separator (CELLGARD CORP.) was interposed between the anode and the cathode, wound, and compressed to be put into a rectangular can. 3.0 g of an organic electrolytic solution was impregnated into the rectangular can, which was then sealed so as to complete a lithium secondary battery. As the organic electrolytic solution, a mixed solvent of ethylene carbonate (EC)/ethyl methyl carbonate (EMC)/propylene carbonate (PC) being in a weight mixing ratio of 30:55:5, was used, the mixed solvent having 1.3 M $LiPF_6$ dissolved therein.

Comparative Example

A lithium secondary battery was prepared in the same manner as in the Example, except that the tetraethyl orthosilicate (TEOS) and the oxalic acid were not added in the preparation of anode active material for fabricating an anode.

FIG. 1 is a scanning electron micrograph (SEM) image showing a cross section of a complex binder having the PVDF and the mesophase $SiO_2$ particles homogenously combined therein according to the present invention. Referring to FIG. 1, the mesophase $SiO_2$ particles with an average particle size of approximately 1 to 2 µm are homogenously combined with the PVDF to form a complex binder of PVDF and $SiO_2$, which enhances thermal stability of a lithium battery compared to that of a conventional single PVDF binder.

Figure 2:
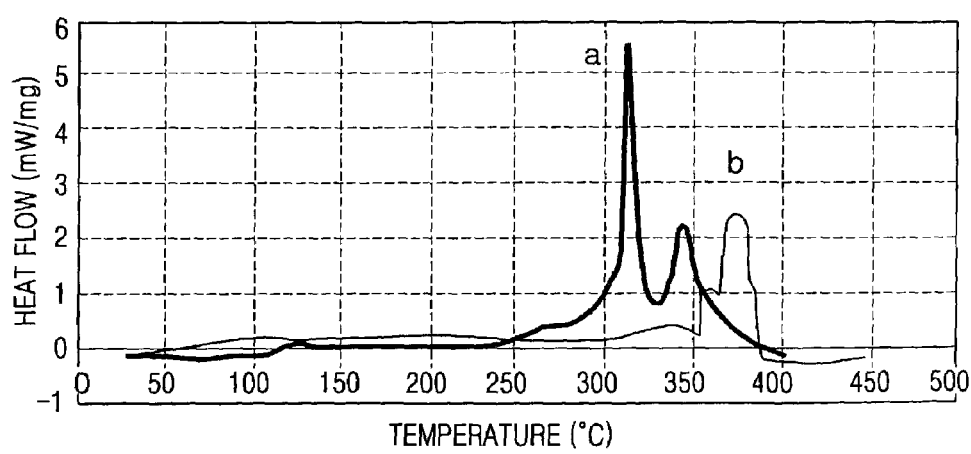
FIG. 2 is a differential scanning calorimetry (DSC) thermogram of conventional PVDF binder and a complex binder having PVDF and mesophase $SiO_2$ particles homogenously combined therein according to an embodiment of the present invention.

This stability is apparent from FIG. 2, which is a differential scanning calorimetry (DSC) thermogram of conventional PVDF binder and a complex binder having PVDF and mesophase $SiO_2$ particles homogenously combined therein according to the present invention. Referring to FIG. 2, the PVDF binder (curve a) shows an exothermic peak around 310° C., which results from a reaction between the PVDF and the $LiC_6$. In contrast, the complex binder having 50% PVDF and 50% mesophase $SiO_2$ particles according to an aspect of the present invention (curve b) shows an exothermic peak around 370° C. arising from the same reaction between the PVDF and the $LiC_6$, which is a considerably higher temperature than that in the case of the curve a this result indicates that the thermal stability is better when using the complex binder of the present invention than when using the conventional PVDF binder.

Figure 3:
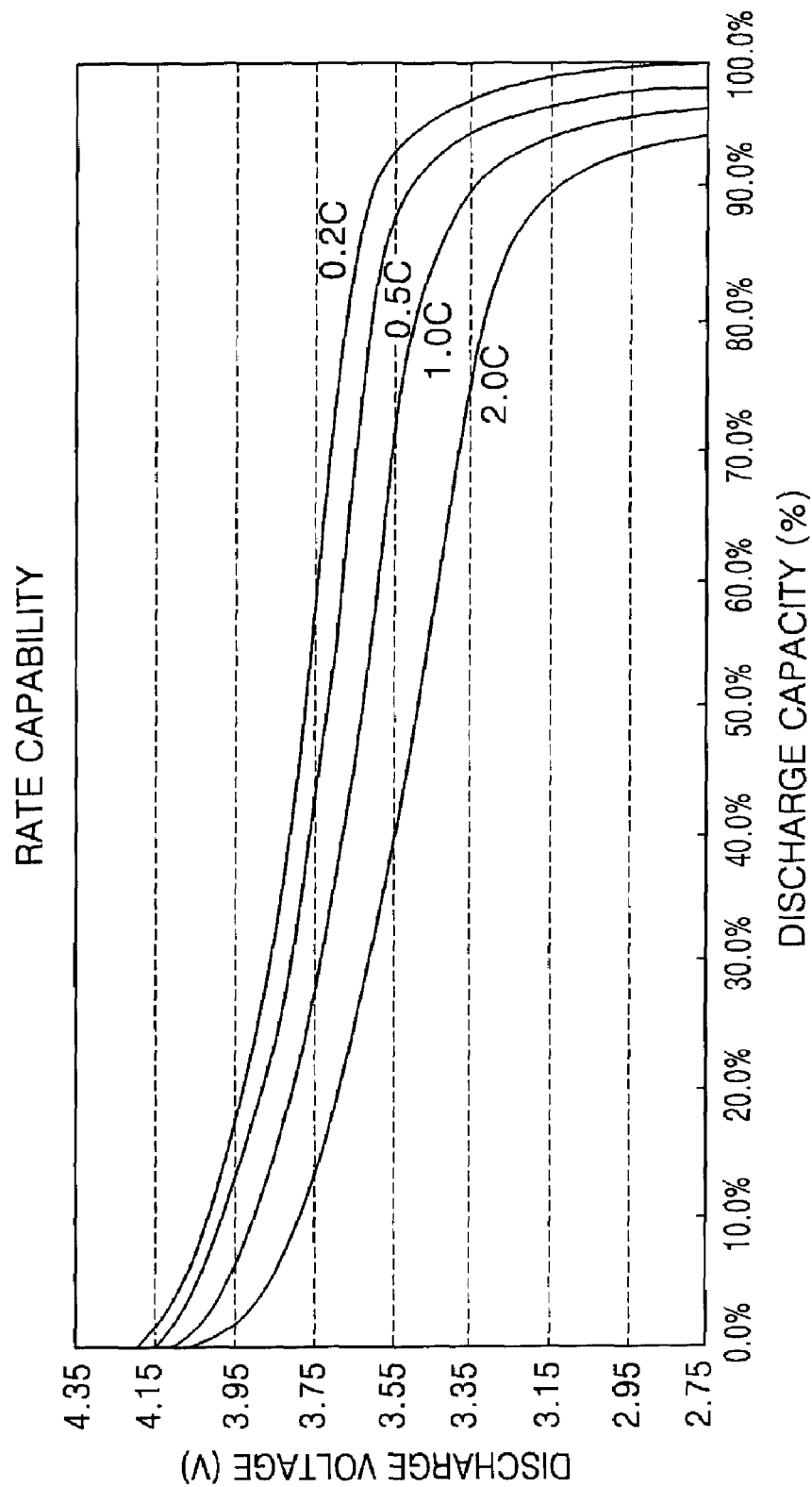
FIG. 3 shows curves showing the rate capability of a lithium secondary battery comprising an anode active material layer having a complex binder having PVDF and mesophase $SiO_2$ particles homogenously combined therein according to an embodiment of the present invention.

FIG. 3 shows curves showing the rate capability of a lithium secondary battery comprising an anode active material layer having a complex binder having PVDF and mesophase $SiO_2$ particles homogenously combined therein according to the present invention. The batteries were tested in the following conditions. That is, the batteries were charged to 4.2 V with a constant current of 0.5 C, and then further charged for 3 hours while constantly maintaining the voltage of 4.2 V. Thereafter, the batteries were discharged with currents of 0.2 C, 0.5 C, 1 C and 2 C, respectively, and cut off at 2.75 V. Referring to FIG. 3, when the batteries were discharged with currents of 0.2 C to 2 C, discharge rates were quite high, that is, 95% or higher relative to an initial capacity. Therefore, it is confirmed that the lithium secondary battery according to the present invention has a good discharge characteristic.

Figure 4:
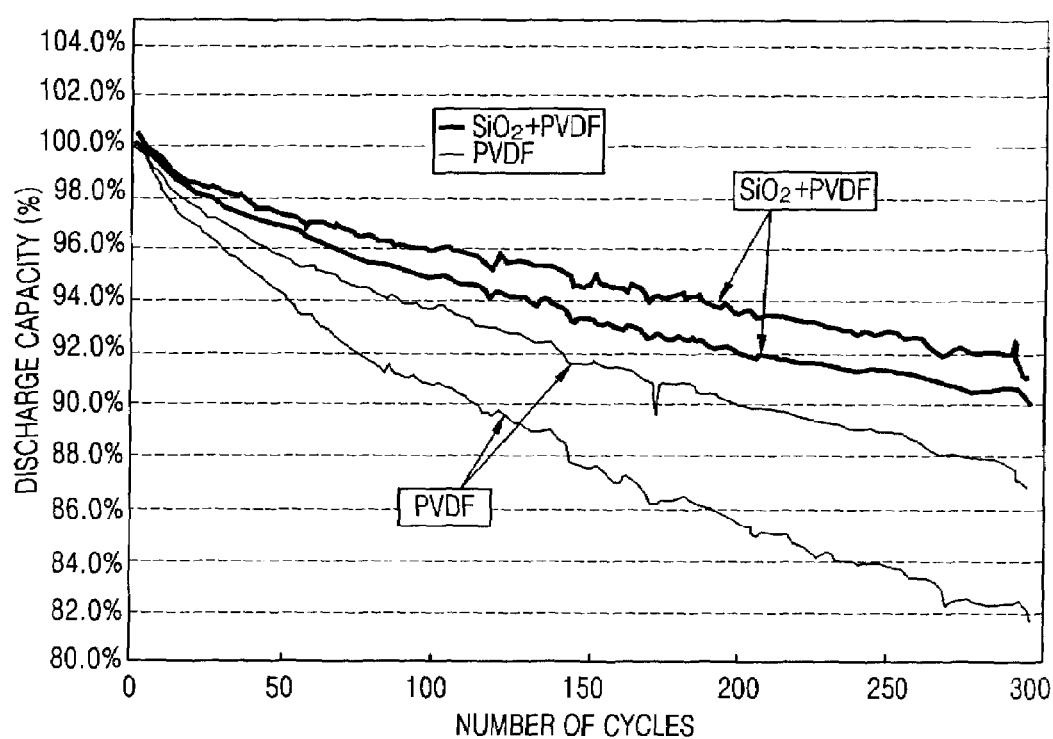
FIG. 4 is a graphical representation showing cycle characteristics of lithium secondary batteries using a conventional PVDF binder and a complex binder having a complex binder having PVDF and mesophase $SiO_2$ particles homogenously combined therein according to an embodiment of the present invention.

FIG. 4 is a graphical representation showing cycle characteristics of lithium secondary batteries using a conventional PVDF binder and a complex binder having the PVDF and the mesophase $SiO_2$ particles homogenously combined therein according to the present invention. Referring to FIG. 4, the top two graphs represent cycle characteristics of the lithium secondary batteries using an anode having a complex binder of the PVDF and the $SiO_2$. The bottom two graphs represent cycle characteristics of the lithium secondary batteries using an anode having a single PVDF binder.

Referring again to FIG. 4, the cycle characteristic of the lithium secondary battery prepared in Example is very good. Specifically, the discharge capacity after 300 cycles was over 90% relative to an initial discharge capacity after one cycle. On the other hand, the discharge capacity of the lithium secondary battery prepared in Comparative Example was considerably poor. Specifically, the discharge capacity after 300 cycles was approximately 80 to 87% relative to an initial discharge capacity after one cycle. Thus, it is confirmed that the cycle characteristic of a lithium battery using a complex binder of the present invention is better than that of a lithium battery using a conventional PDVF binder.

Figure 5:
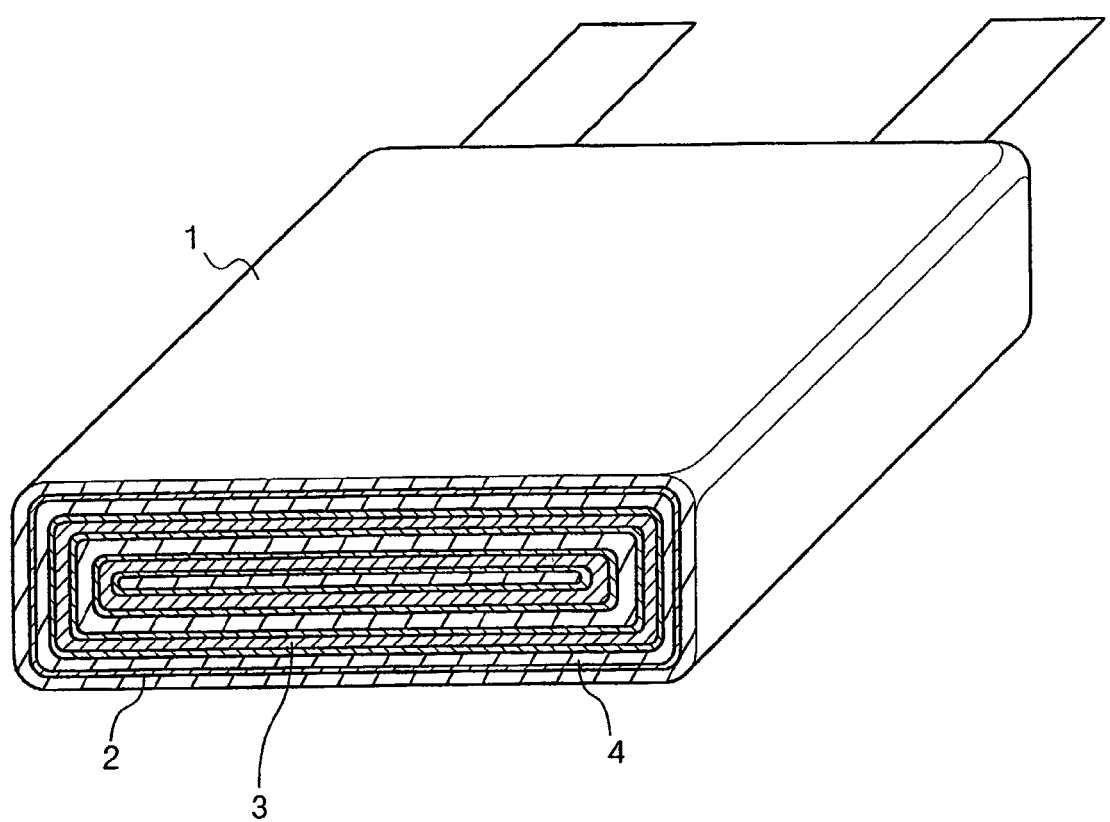
FIG. 5 shows a lithium battery according to an embodiment of the present invention.

As shown in FIG. 5, a lithium battery according to an embodiment of the present invention includes a case 1 containing a positive electrode (i.e., a cathode) 3, a negative electrode (i.e., an anode) 4, and a separator 2 interposed between the positive electrode 3 and the negative electrode 4. The electrolyte is disposed between the positive and negative electrodes 3, 4. The anode 4 and/or the cathode 3 include the complex binder according to the present invention.

As described above, a lithium battery using an electrode according to the present invention has high thermal stability and improved cycle characteristics compared to a lithium battery using a conventional binder singly made of a fluorinated polymer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode comprising:
a current collector; and
active material layers stacked on the current collector, wherein the active material layers include an active material and a complex binder comprising a fluorinated polymer and mesophase $SiO_2$ particles homogenously combined therein.

2. The electrode according to claim 1, wherein the average particle size of the mesophase $SiO_2$ particles is approximately 50 nm to approximately 10 $\mu$m.

3. The electrode according to claim 1, wherein the mesophase $SiO_2$ particles are in an amount of 5 to 75 parts by weight, based on 100 parts by weight of the complex binder in the active material layers.

4. The electrode according to claim 3, wherein the fluorinated polymer in the active material layers is at least one selected from the group consisting of polyvinylidene fluoride (PVDF), copolymers of vinylidene fluoride and hexafluoropropylene, and mixtures of polyvinylidene fluoride (PVDF) and styrene-butadiene rubber (SBR).

5. The electrode according to claim 1, wherein the mesophase $SiO_2$ particles are condensation polymerization products of hydrolyzed products of silicon alkoxide compounds.

6. The electrode according to claim 5, wherein the silicon alkoxide compounds are at least one selected from the group consisting of tetraethyl ortho-silicate (TEOS), trihexylsilane and 2-methyl-1-(trimethylsilyloxy)-1-propene.

7. The electrode according to claim 1, wherein the active material in the active material layers includes at least one cathode active material selected from the group consisting of $LiCoO_2$, $LiMnO_2$, $LiMn_2O_4$, $LiNiO_2$, $LiM_xM_y'O_2$ and sulfur, where M is Mn, Ni or Co, M' is Ni, Cu, Ti or Mg, x is in a range of 0.5 to 2, and y is in a range of 0 to 1.

8. The electrode according to claim 1, wherein the active material in the active material layers includes at least one anode active material selected from the group consisting of crystalline or non-crystalline carbon and graphite.

9. The electrode according to claim 1, wherein the active material layers further comprise 2 to 5 parts by weight of at least one conductive agent selected from the group consisting of carbon black, acetylene black and Ketjen black, based on 100 parts by weight of the complex binder in the active material layers.

10. The electrode according to claim 9, wherein the fluorinated polymer in the active material layers is at least one selected from the group consisting of polyvinylidene fluoride (PVDF), copolymers of vinylidene fluoride and hexafluoropropylene, and mixtures of polyvinylidene fluoride (PVDF) and styrene-butadiene rubber (SBR).

11. A lithium battery comprising:
a cathode having a cathode active material layer disposed on a first current collector;
an anode having an anode active material layer disposed on a second current collector; and
a separator and electrolyte interposed therebetween,
wherein the cathode active material layer and the anode active material layer include corresponding active materials and a complex binder having a fluorinated polymer and mesophase $SiO_2$ particles homogenously combined therein.

12. The lithium battery according to claim 11, wherein the average particle size of the mesophase $SiO_2$ particles is in a range of about 50 nm to about 10 $\mu$m.

13. The lithium battery according to claim 11, wherein the mesophase $SiO_2$ particles are contained in an amount of 5 to 75 parts by weight, based on 100 parts by weight of the complex binder in the active material layers.

14. The lithium battery according to claim 11, wherein the mesophase $SiO_2$ particles are condensation polymerization products of hydrolyzed products of silicon alkoxide compounds.

15. The lithium battery according to claim 14, wherein the silicon alkoxide compounds are at least one selected from the group consisting of tetraethyl ortho-silicate (TEOS), trihexylsilane and 2-methyl-1-(trimethylsilyloxy)-1-propene.

16. The lithium battery according to claim 11, wherein the active material in the cathode active material layer includes at least one cathode active material selected from the group consisting of $LiCoO_2$, $LiMnO_2$, $LiMn_2O_4$, $LiNiO_2$, $LiM_xM_y'O_2$ and sulfur, where M is Mn, Ni or Co, M' is Ni, Cu, Ti or Mg, x is in a range of 0.5 to 2, and y is in a range of 0 to 1.

17. The lithium battery according to claim 11, wherein the active material in the anode active material layer includes at least one anode active material selected from the group consisting of crystalline or non-crystalline carbon and graphite.

18. The lithium battery according to claim 11, wherein the active material layers further comprise 2 to 5 parts by weight of at least one conductive agent selected from the group consisting of carbon black, acetylene black and Ketjen black, based on 100 parts by weight of the complex binder in the active material layers.

19. The lithium battery according to claim 11, wherein the fluorinated polymer in the active material layers is at least one selected from the group consisting of polyvinylidene fluoride (PVDF), copolymers of vinylidene fluoride and hexafluoropropylene, and mixtures of polyvinylidene fluoride (PVDF) and styrene-butadiene rubber (SBR).

20. A method of manufacturing an electrode, comprising:
providing a current collector; and
forming a coating on the current collector, the coating comprising an electrode active material and a complex binder, the complex binder having a fluorinated polymer and mesophase $SiO_2$ particles homogenously combined in the coating.

21. The method according to claim 20, wherein the forming of the complex binder comprises:
providing a mixture of 5 to 10 parts by weight of the fluorinated polymer binder, 0.25 to 7.5 parts by weight of a silicon alkoxide compound, 82.5 to 95 parts by weight of the electrode active material and a solvent; and
hydrolyzing the silicone alkoxide compound and performing condensation polymerization of the resulting hydrolysis products after applying the mixture to the current collector to form the mesophase $SiO_2$ particles.

22. The method according to claim 21, further comprising adding 0.1 to 2 parts by weight of an acidic or basic catalyst to the active material composition.

23. The method according to claim 22, wherein the acidic catalyst is oxalic acid.

24. The method according to claim 21, wherein the silicon alkoxide compounds are at least one selected from the group consisting of tetraethyl ortho-silicate (TEOS), trihexylsilane and 2-methyl-1-(trimethylsilyloxy)-1-propene.

25. The method according to claim 21, wherein the forming the electrode active material composition comprises first mixing the fluorinated polymer binder and the silicon alkoxide compound with the solvent.

26. The method according to claim 20, wherein the average particle size of the mesophase $SiO_2$ particles is in a range of about 50 nm to about 10 μm.

27. The method according to claim 20, wherein the forming of the complex binder comprises:

providing a mixture of 5 to 10 parts by weight of the fluorinated polymer binder, 0.25 to 7.5 parts by weight of a silicon alkoxide compound, 82.5 to 95 parts by weight of the electrode active material and a solvent;

coating the current collector with the mixture; and heating the mixture to at 90 to 130 degrees C. after the coating of the current collector to form the mesophase $SiO_2$ particles.

* * * * *